US007207886B2

(12) United States Patent
Izumi (10) Patent No.: US 7,207,886 B2
(45) Date of Patent: Apr. 24, 2007

(54) GAME SYSTEM, GAME DATA EXCHANGE CONTROL METHOD, GAME MACHINE, AND COMPUTER READABLE STORAGE MEDIUM

(75) Inventor: Tadakatsu Izumi, Nagoya (JP)

(73) Assignee: Konami Corporation, Tokyo (JP)

( * ) Notice: Subject to any disclaimer, the term of this patent is extended or adjusted under 35 U.S.C. 154(b) by 0 days.

(21) Appl. No.: 09/750,604

(22) Filed: Dec. 28, 2000

(65) Prior Publication Data

US 2001/0008852 A1 Jul. 19, 2001

(30) Foreign Application Priority Data

Jan. 14, 2000 (JP) ............................ P2000-010091

(51) Int. Cl.
*A63F 13/00* (2006.01)
*A63F 13/06* (2006.01)
*A63F 13/08* (2006.01)

(52) U.S. Cl. ............................ 463/40; 463/30; 463/31; 463/42

(58) Field of Classification Search ............... 463/1, 463/40–42, 30–31
See application file for complete search history.

(56) References Cited

U.S. PATENT DOCUMENTS

| | | | | |
|---|---|---|---|---|
| 5,048,831 A | * | 9/1991 | Sides | 273/460 |
| 5,618,045 A | * | 4/1997 | Kagan et al. | 463/40 |
| 5,860,862 A | * | 1/1999 | Junkin | 463/1 |
| 5,879,005 A | * | 3/1999 | Baca | 273/255 |
| 5,971,855 A | * | 10/1999 | Ng | 463/40 |
| 6,009,458 A | * | 12/1999 | Hawkins et al. | 709/203 |
| 6,200,216 B1 | * | 3/2001 | Peppel | 463/1 |
| 6,292,706 B1 | * | 9/2001 | Birch et al. | 700/91 |
| 6,539,544 B2 | * | 3/2003 | Ebisawa | 717/177 |

FOREIGN PATENT DOCUMENTS

GB 2163929 3/1986

OTHER PUBLICATIONS

Frase, Tuesday and Tyler, Melissa, "The Official Guide to Ultima Online," 1997, cover and p. 2, 22, 23.*
"Shadow Tower Official Guide Book" (published Aug. 8, 1998) p. 174, 175, 176.
Jun. 30, 1999 "Pocket Lure Boy" Official Guide (Japanese with partial English translation) Kingrecords/Kaga Tech 114-117.

* cited by examiner

*Primary Examiner*—Corbett B. Coburn
*Assistant Examiner*—William H McCulloch
(74) *Attorney, Agent, or Firm*—Jordan and Hamburg LLP (57) ABSTRACT

There is provided a game system which makes it possible to implement a transaction desired by a side which receives a game element. When delivering a game element from a user of a first game machine 1 to a user of a second game machine 1, transaction information for identifying game elements possessed by the user of the first game machine is provided to the second machine. In the second game machine, a list of acquirable game elements is displayed according to the provided transaction information. The user of the second game machine is urged to select a game element to be acquired, from the displayed game elements. The selection result is returned from the second game machine to the first game machine. In the first game machine, data identifying the possession state of game elements is updated so as to decrease the game element deprived of from the possession range of the user. In the second game machine, data identifying the possession state of game elements is updated so as to add the acquired game element to the possession range of the user.

13 Claims, 6 Drawing Sheets

ITEM POSSESSION DATA

| ITEM NUMBER | 1 | 2 | 3 | 4 | 5 | 6 | 7 | 8 | 9 | ... |
|---|---|---|---|---|---|---|---|---|---|---|
| THE NUMBER OF ITEM POSSESSIONS | 3 | 1 | 0 | 2 | 2 | 0 | 0 | 1 | 1 | ... |

↓

1 1 0 1 1 0 0 1

TRANSMISSION DATA AT ONE TIME

GAME SYSTEM, GAME DATA EXCHANGE CONTROL METHOD, GAME MACHINE, AND COMPUTER READABLE STORAGE MEDIUM

BACKGROUND OF THE INVENTION

1. Technical Field of the Invention

The present invention relates to a game system allowing a communication competition.

2. Description of the Related Art

In recent years, there are provided game systems in which a plurality of game machines are connected to each other via their communication devices and a game is advanced in a competition form while exchanging data among the game machines. Furthermore, as a different form of the communication competition, there is also put to practical use a game system in which a predetermined server holds game programs and data, the server distributes data to a plurality of game machines (which may be either a dedicated game machine or a general purpose computer) serving as clients connected to the server via a network, and a competition is conducted among users of clients.

In such a game system for conducting a communication competition, transactions (such as exchange and movement) of game elements, such as items and characters, are allowed, and a plan is elaborated so as to incorporate thereby various enjoyments which cannot be obtained from a single game machine into a game. For example, a specific item (such as a weapon used by a defeated user in a competition on a game) is moved from a game machine of the user defeated in the competition to a game machine of a winner side as a reward of the competition. As a result, it is also made possible to scramble for an item among users of a plurality of game machines.

In a conventional game system, a transacted game element is automatically determined according to a game result, a rule and the like. In its determination process, an intention of the user (player) of the winner side game machine is not reflected. Therefore, a reluctant transaction, such as duplicated reception of a game element that the player of the winner side already has, is forced sometimes upon the player of the winner side. In such a case, a merit obtained by enabling the transaction of a game element is not sufficiently exhibited, and there is a fear that the charm of the game is hampered. There is also such a game system that characters are made exchangeable among game machines aiming at character collection. In that case as well, a player of a character delivery side determines which character should be transmitted, and the character receiving side cannot determine the subject of transaction.

SUMMARY OF THE INVENTION

Therefore, an object of the present invention is to provide a game system capable of implementing a transaction desired by a game element receiving side.

In accordance with a first aspect of the present invention, in a game system including a plurality of game machines which allows users to play a common game by utilizing data exchange via communication device, at least one game element possessed by a user of each game machine, among a plurality of game elements expected to be used in the game, being made capable of being transacted between users in the common game, the game system includes: possession information storage device for storing possession information identifying a possession state of the game elements concerning a user of each game machine; discrimination device for discriminating a first game machine of a side which delivers a game element and a second game machine of a side which receives the game element, from the plurality of game machines; transaction information providing device for providing transaction information for discriminating game elements acquirable to a user of the second game machine from game elements possessed by a user of the first game machine, to the second game machine, on the basis of the possession information corresponding to the user of the first game machine; presentation device for presenting the acquirable game elements to the user of the second game machine via a display device of the second game machine, on the basis of the transaction information; transaction subject selection device for selecting at least one game element to be actually acquired by the user of the second game machine, from the acquirable game elements in response to a predetermined selection and decision operation on an input device of the second game machine; and information update device for updating the possession information so as to add the selected game element to game elements possessed by the user operating the second game machine, in response to the selection of the game element conducted by the transaction subject selection device.

According to the first aspect of the present invention, acquirable game elements are presented to the user of the second game machine set as the side which receives a game element. In response to this, the user of the second game machine conducts predetermined selection and decision operation. As a result, a game element actually acquired by the user of the second game machine is determined. Therefore, the game element delivered from the first game machine to the second game machine can be determined with due regard to the intention of the user who receives a game element. As a result, it is possible to implement the transaction desired by the side which receives the game element and sufficiently exhibit the merit obtained by making possible the transaction of a game element between game machines. Accordingly, the charm of the game can be sufficiently increased.

In accordance with a second aspect of the present invention, in the game system according to the first aspect of the present invention, the information update device may update the possession information so as to decrease the selected game element from the game elements possessed by the user of the first game machine. As a result, it is possible to provide such a sense that the user of the first game machine is deprived of the game element selected by the user of the second game machine.

In accordance with a third aspect of the present invention, in the game system according to the first aspect of the present invention, a game for conducting a predetermined competition among the plurality of game machines may be made executable. In that case, the first game machine and the second game machine may be set, distinguished, or discriminated on the basis of a result of the competition. For example, if the winner side of a competition is set to the second game machine and the loser side is set to the first game machine, it is possible to implement such dramatic presentation that the winner user deprives the loser user of a desired game element.

In accordance with a fourth aspect of the present invention, the game system according to the first aspect of the present invention may include: operation information providing device for providing operation information for identifying a situation of the selection and decision operation from the second game machine to the first game machine;

and selection situation display device for displaying a situation of selection of the game element on a display device of the second game machine in response to the selection and decision operation, and displaying a situation of selection of the game element on a display device of the first game machine, on the basis of the operation information. By doing so, such a situation that the user of the game element receiving side is selecting a game element is displayed on the display devices of the first and second game machines. The users of respective game machines can feel actually the element selection and decision as common experience.

In accordance with a fifth aspect of the present invention, the present invention can also be grasped as a game data exchange control method applied to a game system, the game system including a plurality of game machines which allows users to play a common game by utilizing data exchange via communication device, at least one game element possessed by a user of each game machine, among a plurality of game elements expected to be used in the game, being made capable of being transacted between users in the common game. The method includes the steps of: producing possession information for identifying a possession state of the game elements concerning a user of each game machine; discriminating a first game machine of a side which delivers a game element and a second game machine of a side which receives the game element, from the plurality of game machines; providing transaction information for discriminating game elements acquirable to a user of the second game machine from game elements possessed by a user of the first game machine, to the second game machine, on the basis of the possession information corresponding to the user of the first game machine; presenting the acquirable game elements to the user of the second game machine via a display device of the second game machine, based on the transaction information; selecting at least one game element to be actually acquired by the user of the second game machine, from the acquirable game elements in response to a predetermined selection and decision operation on an input device of the second game machine; and updating the possession information so as to add the selected game element to game elements possessed by the user operating the second game machine, in response to the selection of the game element.

If such an exchange control method is effected, the game element delivered from the first game machine to the second game machine can be determined with due regard to the intention of the user who receives a game element, for the same reason as that of the above described game system. As a result, it is possible to implement the transaction desired by the side which receives the game element and sufficiently exhibit the merit obtained by making possible the transaction of a game element between game machines. Accordingly, the charm of the game can be sufficiently increased.

In accordance with a sixth aspect of the present invention, the present invention can also be grasped as a game machine which allows a user of an own machine to play a common game with a different game machine by utilizing data exchange via communication device, at least one game element possessed by each of users of the own game machine and the different game machine, among a plurality of game elements expected to be used in the game, being made capable of being transacted between the users in the common game. Furthermore, the own game machine includes: possession information storage device for storing possession information for identifying a possession state of the game elements concerning a user of the own game machine; discrimination device for recognizing the own game machine as either a first game machine of a side which delivers a game element or a second game machine of a side which receives the game element, and recognizing the different machine as either of them; transaction information providing device, responsive to recognition of the own machine as the first game machine, for providing transaction information for discriminating game elements acquirable to a user of the different game machine from game elements possessed by a user of the own game machine, to the different game machine, based on the possession information; presentation device, responsive to recognition of the own machine as the second game machine, for presenting the acquirable game elements to the user of the own game machine via a display device of the own game machine, on the basis of the transaction information for discriminating game elements acquirable to the user of the own game machine provided by the different game machine; transaction subject selection device, responsive to a predetermined selection and decision operation conducted on an input device of the own game machine in response to the presentation of the game elements to the user of the own game machine, for selecting at least one game element to be actually acquired by the user of the own game machine, from the acquirable game elements, and providing selection result information identifying the selection result to the different game machine; and information update device, responsive to selection of the game element conducted by the user of the own game machine based on the transaction information provided by the different game machine, or responsive to provision of selection result information for identifying the selection result of the game element from the different game machine in response to the provision of the transaction information to the different game machine, for updating the possession information, on the basis of the selection result.

By connecting a plurality of such game machines via communication device, a game system of the present invention can be implemented.

In accordance with a sixth aspect of the present invention, the present invention can also be grasped as a computer readable storage medium. The storage medium has a program recorded thereon, the program allowing a user of an own game machine to play a common game with a different game machine by utilizing data exchange via communication device, and the program making it possible to transact at least one game element possessed by each of users of the own game machine and the different game machine, among a plurality of game elements expected to be used in the game, between the users in the common game, the program being formed so as to make a computer included in the own game machine function as: possession information storage device for storing possession information for identifying a possession state of the game elements concerning a user of the own game machine; discrimination device for recognizing the own game machine as either a first game machine of a side which delivers the game element or a second game machine of a side which receives the game element, and recognizing the different machine as either of them; transaction information providing device, responsive to recognition of the own machine as the first game machine, for providing transaction information for discriminating game elements acquirable to a user of the different game machine from game elements possessed by a user of the own game machine, to the different game machine, based on the possession information; presentation device, responsive to recognition of the own machine as the second game machine, for presenting the acquirable game elements to the user of the own game machine via a display device of the own game machine, based on the transaction information for discriminating game elements acquirable to the user of the own game machine provided by the different game machine; transaction subject selection device, responsive to a predetermined selection and decision operation conducted on an input device of the own game machine in response to the presentation of the game elements to the user of the own game machine, for selecting at least one game element to be actually acquired by the user of the own game machine, from the acquirable game elements, and providing selection result information identifying the selection result to the different game machine; and information update device, responsive to selection of the game element conducted by the user of the own game machine based on the transaction information provided by the different game machine, or responsive to provision of selection result information identifying the selection result of the game element from the different game machine in response to the provision of the transaction information to the different game machine, for updating the possession information, based on the selection result.

If the program of such a recording medium is executed by a computer of a game machine, a game system of the present invention can be formed.

In the present invention, a game element means an element, such as an instrument or magic used by a character appearing in a roll playing game or an action game, which can be used by users of the game machines and use of which exerts influence upon the progress of the game (such as the competition result or a story change). The character itself may be transacted as a game element.

DESCRIPTION OF THE PREFERRED EMBODIMENTS

Figure 1:
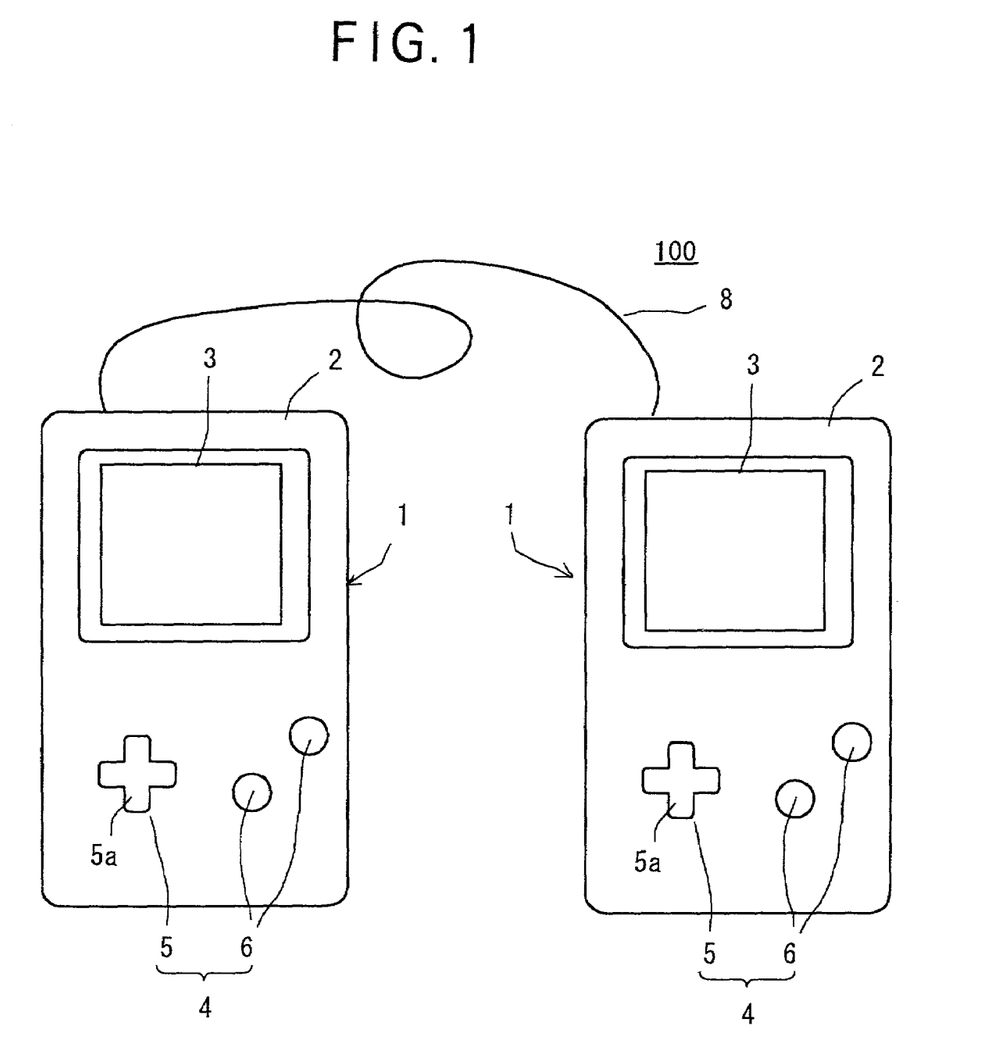
FIG. 1 is a diagram showing the outline of a game system according to an embodiment of the present invention.

FIG. 1 shows an embodiment of a game system of the present invention. This game system 100 is formed by connecting a pair of portable game machines 1 and 1 to each other via a communication cable 8. The portable game machines 1 have basically the same configuration. Each of the portable game machines 1 has a main body 2, a liquid crystal monitor 3 serving as a display device attached to the main body 2, and an input device 4. However, a plurality of game machines forming the game system of the present invention need only be capable of executing a common game, and they need not necessarily have the same configuration.

The input device 4 includes a direction order switch 5 and a plurality of pushbutton switches 6. The direction order switch 5 has, for example, a cross-shaped operation member 5a, and outputs a signal corresponding to operation of the operation member 5a in the upward, downward, leftward, or rightward direction (i.e., depressing operation of an up, down, left, or right end). Such a configuration of the input device 4 is well known, and various modifications are possible. For example, instead of the operation member 5a, one pushbutton switch may be disposed in each of up, down, left and right positions.

Figure 2:
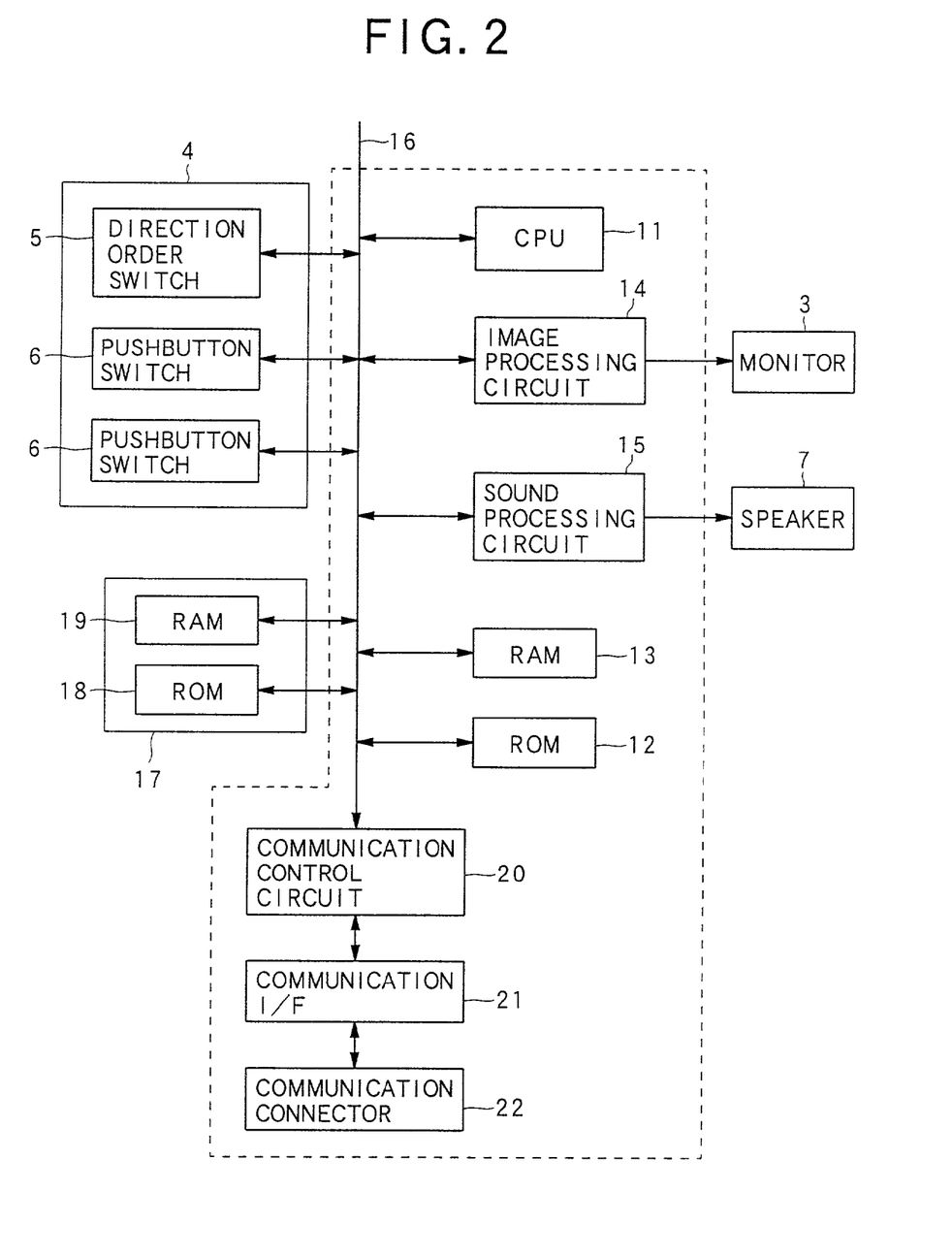
FIG. 2 is a block diagram showing the schematic configuration of a control system of each of game machine which forms the game system of FIG. 1.

FIG. 2 shows the configuration of a control device 10 included in each game machine 1. The control device 10 is formed as a computer having a CPU 11 utilizing a microprocessor as its nucleus. A ROM 12 and a RAM 13 serving as a main storage, an image processing circuit 14, and a sound processing circuit 15 are connected to the CPU 11 via a bus 16. Programs required for basic control (such as start processing) of the game machine 1 are stored in the ROM 12. A work area for the CPU 11 is secured in the RAM 13. In response to a drawing order issued by the CPU 11, the image processing circuit 14 controls the liquid crystal monitor 3 and causes a predetermined image to be displayed on its screen. The sound processing circuit 15 generates an analog speech signal according to a pronunciation issued by the CPU 11 and outputs it to a speaker 7.

The switches 5 and 6 of the input device 4 are connected to the CPU 11 via the bus 16. As a result, the CPU 11 can distinguish the operation state of the switches 5 and 6. Furthermore, an external storage device 17 which is separate from the control device 10 is connected to the bus 16. The external storage device 17 is formed, for example, so as to be a cassette which can be freely attached to and detached from the main body 2. Within the external storage device 17, for example, a ROM 18 and a RAM 19 are provided as a storage medium. Programs for making the control device 10 function as devices of the present invention, and various data required for execution of the programs are recorded in the ROM 18 beforehand. Save data of a game, for example, are recorded in the RAM 19 as occasion demands. The data of the RAM 19 are held by an auxiliary battery incorporated in, for example, the external storage device 17. Instead of the RAM 19, a rewritable ROM, such as an EEPROM, may also be used. The storage medium of the external storage device 17 is not limited to semiconductor storage elements, but various storage media such as a magnetic storage medium, an optical storage medium, and a magneto-optical storage medium may be used. Although an interface circuit is interposed between the bus 16 and each element as occasion demands, its illustration is omitted. The configuration of the control device 10 is not limited to that described above, but various control devices may be used.

In order to conduct data communication between the game machines 1, a communication control circuit 20 is connected to the CPU 11 via the bus 16. A communication connector 22 is connected to the communication control circuit 20 via a communication interface 21. The communication cable 8 shown in FIG. 1 is connected to the communication connectors 22 of the game machines 1. Data communication between the game machines 1 thus becomes possible. The communication device between the game machines 1 and 1 is not limited to a wire form such as the communication cable 8, but wireless communication device such as infrared communication may also be used. Communication device of two or more kinds may be used together.

In the game system 100 having the configuration heretofore described, games of various genres can be played on the screen of the monitor 3 by loading a program recorded in the ROM 18 of the external storage device 17 into the RAM 13 and executing it in the CPU 11. In the present embodiment, however, it is assumed that players (i.e., users of the game machines 1) operate specific characters (hereafter referred to as player characters) appearing in a game via the input devices 4 to repeat adventures and competitions, the player characters acquire various items prepared beforehand on data of the ROM 18, and the story further proceeds according to the result of acquisition. Assuming that such a game is executed, description of the present embodiment will be continued.

As for items, for example, a large number of weapons and protectors to be used by the player characters are prepared. They are differentiated from various viewpoints such as the effect and the number of times of use. According to which item is used in the competition or adventure, parameters, such as the ability and physical strength, of the player characters are changed. As a result, superiority or inferiority of the competition or the progress of the competition is changed. Each item is provided with a serial number in one-to-one correspondence. Information indicating a feature and an attribute of each item, such as the name, use condition, and effect of each item, is determined by the game producer, and written into the ROM 18 as a kind of game data beforehand. There is the case where the competition opponent of the player character is a hypothetical enemy character operated by the CPU 11 of the same game machine 1, and the case where the competition opponent of the player character is a different player character operated by a different player by using a different game machine 1 connected via the communication cable 8.

In the case where a communication competition has been conducted, the winner player of the competition can deprive the defeated player of a desired item. In order to make such processing possible, the CPU 11 of each game machine 1 creates item possession data for distinguishing the possession states of respective items and stores the data in the RAM 13. The item possession data stored in the RAM 13 are successively updated as the game proceeds. The item possession data corresponds to possession information.

Figure 3:
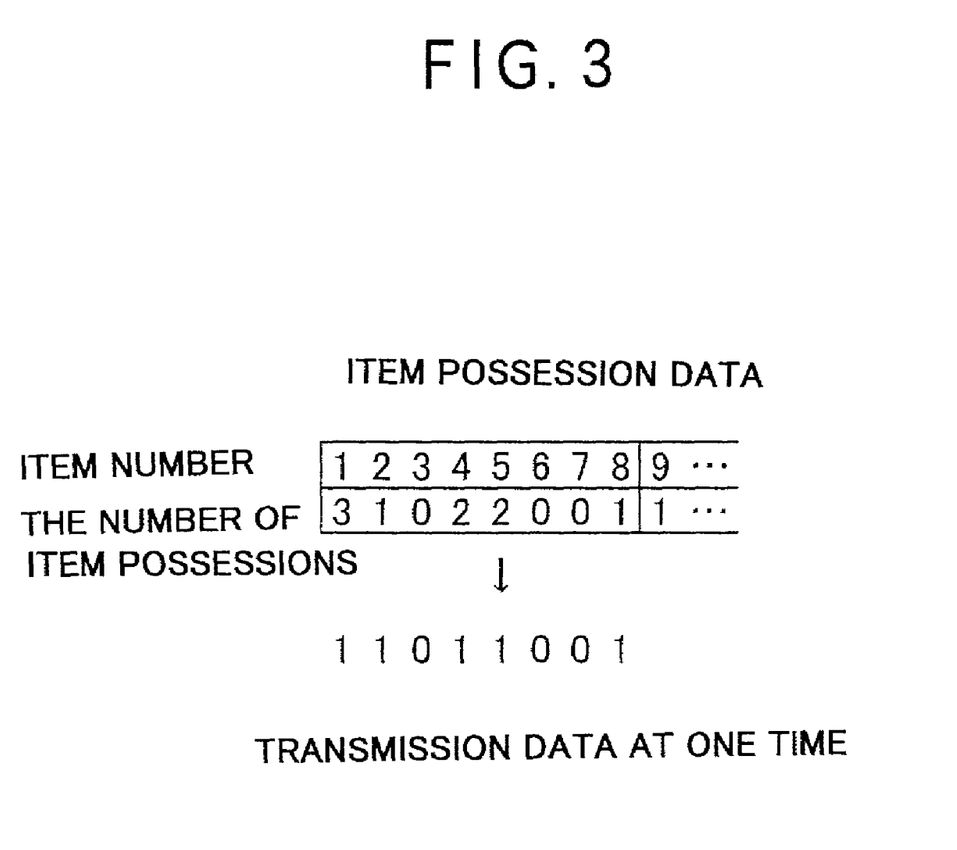
FIG. 3 is a diagram showing an example of data used to transact an item in the game system of FIG. 1.

The item possession data stored in the RAM 13 are limited to the item possession data corresponding to the user of the game machine 1 on which the RAM 13 is mounted. The item possession data are produced as data which associate a serial number of each item with the number of possessions of each item as shown in FIG. 3. Information other than the number of possessions of each item may be added to the item possession data. The item possession data recorded in the RAM 13 of each game machine 1 is preserved in the external storage device 17 connected to the game machine 1 having the RAM 13 mounted thereon, as occasion demands.

A procedure of item transaction according to the result of the communication competition will now be described by referring to FIGS. 4A, 4A, and 5.

Figure 4:
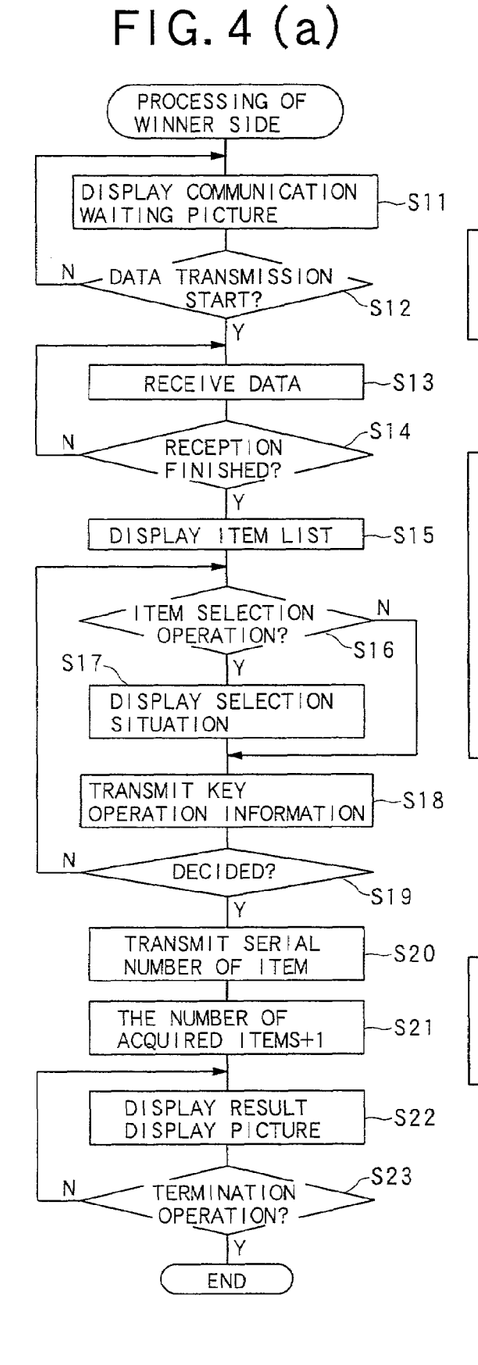
FIGS. 4A and 4B are flowcharts showing processing executed by respective game machines in the game system of FIG. 1.
Figure 5:
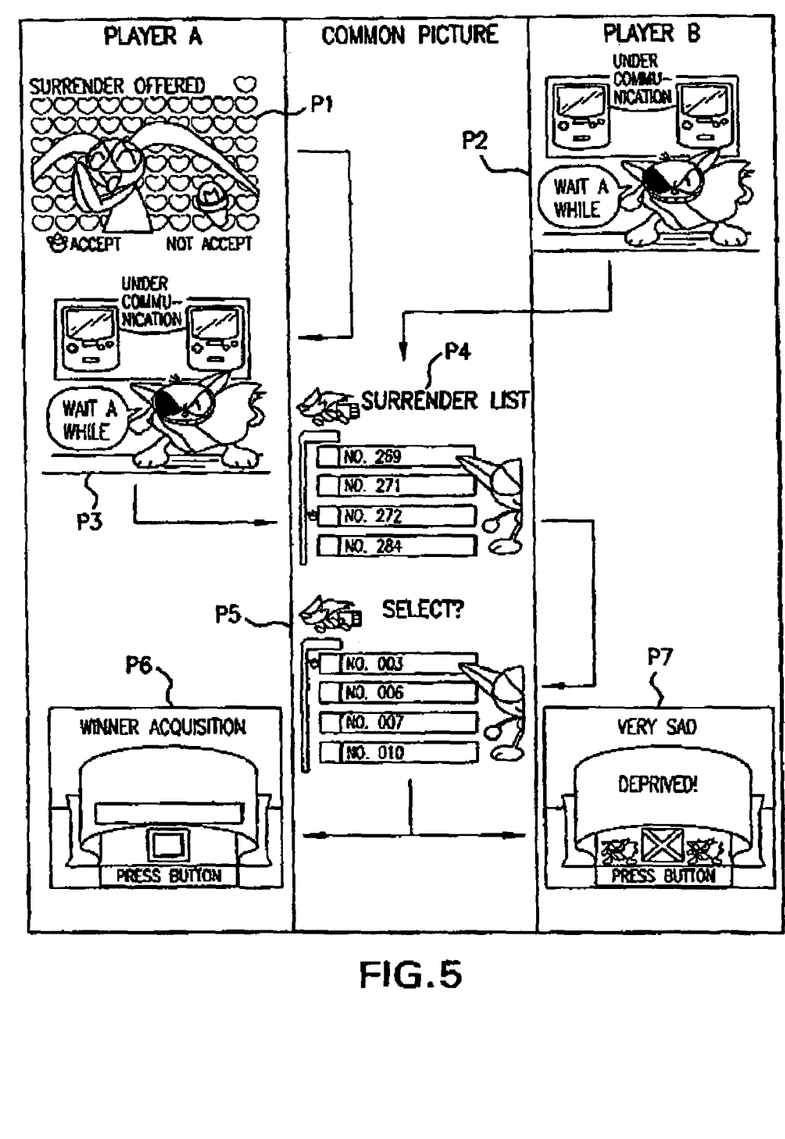
FIG. 5 is a diagram showing game pictures corresponding to the processing of FIG. 4.

FIGS. 4A and 4B are flowcharts showing an item transaction procedure using the game system 100. FIG. 5 is a diagram showing the change of a game screen corresponding to the flowcharts. In the ensuing description, it is assumed that the winner of a communication competition is a player A and the loser is a player B.

A communication competition is started between the players A and B. If the player B offers surrender to the player A by operating one of the game machines 1, information indicating the surrender is transferred to the other of the game machines 1. Upon receiving this, a picture P1 showing a character operated by the player B so as to offer surrender is displayed on the monitor 3 of the game machine 1 operated by the player A, as shown in FIG. 5. Furthermore, a picture P2 showing that communication is under way is displayed on the monitor 3 of the game machine 1 of the player B. If in this state the player A accepts the surrender by operating the input device 4 of the own game machine 1, then the competition is finished, and the game machine 1 of the player B and the game machine 1 of the player A are recognized in the game machines 1 and 1 as a first game machine of the side which delivers an item and a second game machine of the side which receives the item. Then processing of FIG. 4A is started by the CPU 11 of the game machine 1 of the player A, and processing of FIG. 4B is started by the CPU 11 of the game machine 1 of the player B. Hereafter, contents of processing will be described making a distinction between respective game machines 1.

In the game machine 1 operated by the player A, a communication waiting picture P3 is first displayed on the monitor 3 (step S11). Subsequently, it is determined whether or not transmission of data serving as transaction information for distinguishing the item possession state of the player B is started by the game machine 1 of the player B (step S12). Until the data transmission is started, subsequent processing is reserved. If the transmission is started, then data reception is started and the reception operation is continued until completion of the reception (steps S13 and S14). At this time, data (transaction information) transmitted from the game machine 1 of the player B is formed by arranging information pieces each having one bit for one item, in the order of increasing serial number as shown in FIG. 3. Each information piece represents whether or not the player B possesses an item. If the player B possesses the item, the information piece is set to "1." If the player B does not possess the item, the information piece is set to "0." As for the transmission data, data are put together and transmitted by appropriate quantities of data (such as one byte) in the order of increasing serial number.

If reception of data concerning the item possession state is completed, then an item list picture P4 showing a list of items that the player A can acquire is displayed on the monitor 3 of the game machine 1 of the player A on the basis of received data (step S15). At this time, all items possessed by the player B may be displayed as acquirable items. Or only items satisfying predetermined conditions out of items possessed by the player B may be displayed as acquirable items. For example, in the case where usable characters are determined for respective items, only items which are made usable to the character operated by the player A, among items possessed by the player B may be displayed in the item list picture P4.

In the item list picture P4, names of acquirable items are arranged at predetermined intervals in the vertical direction and displayed in the picture. In the case where there are so many items as not to be incorporated in one screen of the monitor 3, all of the acquirable items can be presented to the player A by, for example, scrolling the picture P4 in the vertical direction in response to the operation of the direction order switch 5 in the upward or downward direction or switching the picture P4 as if the pages of a book are turned over.

If the item list picture P4 is displayed, subsequently it is determined whether or not predetermined selection operation has been conducted on the game machine 1 of the player A (step S16). By the selection operation, the player A specifies items of acquisition candidates from the items displayed in the item list picture P4. If the selection operation is conducted, then a selection situation picture P5 of FIG. 5 showing how items of acquisition candidates are changed according to the contents of the selection operation is displayed on the monitor 3 of the game machine 1 of the player A (step S17). If there is not the item selection operation at the step S16, the processing of the step S17 is skipped. Subsequently, key operation information for identifying the contents of the selection operation is transmitted to the game machine 1 of the player B (step S18). Also in the case where the item selection operation is not conducted at the step S16, key operation information indicating that the item selection operation has not been conducted is transmitted to the game machine 1 of the player B. Thereafter, it is determined whether or not the player A has conducted predetermined decision operation on the input device 4 (step S19). If the decision operation has not been conducted, the processing is returned to the step S16. If the decision operation is judged at the step S19 to have been conducted, then an item selected as the acquisition candidate when the operation has been conducted is determined as the item acquired by the player A, and the serial number of the item is transmitted to the game machine 1 of the player B (step S20). Subsequently, the item possession data in the RAM 13 of the game machine 1 operated by the player A is updated so as to increase the number of items acquired by the player A (step S21) Thereafter, a result display picture P6 of FIG. 5 is displayed on the monitor 3 of the game machine 1 of the player A (step S22). Thereafter, the processing of the winner side is finished in response to predetermined termination operation (step S23) on the input device 4 of the game machine 1 of the player A.

On the other hand, in the game machine 1 of the player B which becomes the loser side, transmission data for identifying the above described item possession state is first produced on the basis of the item possession data of the player B stored in the RAM 13 of the game machine 1, in response to the decision of the victory or defeat of the competition (step S31). Subsequently, the produced data is transmitted to the game machine 1 of the player A (step S32). In response to termination of the transmission, the item list picture P4 is displayed on the monitor 3 of the game machine 1 of the player B (steps S33 and S34).

Thereafter, processing of receiving the key operation information for identifying the contents of the item selection operation is conducted (step S35). This information is transmitted at the step S18 of FIG. 4A. Subsequently, it is determined on the basis of the key operation information whether or not the player A has selected an item (step S36). If the selection is conducted, then a selection situation picture P5 of FIG. 5 showing how items of acquisition candidates are changed according to the contents of the selection is displayed on the monitor 3 of the game machine 1 of the player B (step S37). At this time, the selection situation picture P5 is displayed on the monitor 3 of the game machine 1 of the player A as well by the processing at the step S17 of FIG. 4A. Therefore, the situation of item selection is conveyed to the players A and B in real time. The item selection can be impressed on the both players as a kind of event corresponding to the termination of the competition. If it is determined at the step S36 that an item is not selected, the step S37 is skipped.

Subsequently, it is determined whether or not item decision operation has been conducted on the game machine 1 of the player A (step S38). If there is the item decision, then processing of receiving the serial number of the selected item from the game machine 1 of the player A is executed (step S39). By the way, it can be determined whether or not the decision operation has been conducted, by detecting the transmission of the serial number of the item from the game machine 1 of the player A (see the step S20). It is also possible to transmit information indicating that the decision operation has been conducted from the game machine 1 of the player A to the game machine 1 of the player B prior to the transmission start of the serial number. In this case, it is determined on the basis of this information whether or not the decision operation has been conducted.

After the serial number has been received, the item possession data stored in the RAM 13 of the game machine 1 of the player B is updated so as to decrease the number of the item deprived of by the player A (step S40). Thereafter, a result display picture P7 of FIG. 5 is displayed on the monitor 3 of the game machine 1 of the player B (step S41). Thereafter, the processing of the loser side is finished in response to predetermined termination operation (step S42) on the input device 4 of the game machine 1 of the player B.

In the case where the player A has become a loser and the player B has become a winner, the processing of FIG. 4B is executed in the game machine 1 operated by the player A and the processing of FIG. 4A is executed in the game machine 1 operated by the player B.

The present invention is not limited to the embodiment heretofore described, but may be implemented in various forms. For example, the game element transacted between the game machines is not limited to one set as "item," but various elements supposed to be used in the game can be made the subject of transaction. For example, instead of instruments used by the characters, characters themselves maybe handled as the game elements of the transaction subject. The number of game machines connected to play a common game such as a communication competition is not limited to two, but may be at least three. In the case where at least three game machines are connected at the same time, it is assumed that the user of at least one game machine becomes a winner or loser and a plurality of users operating at least two other game machines become winners or losers. At this time, an item or a different game element may be transacted between one user and a plurality of users or between a plurality of users and a plurality of users in accordance with the present invention.

Figure 6:
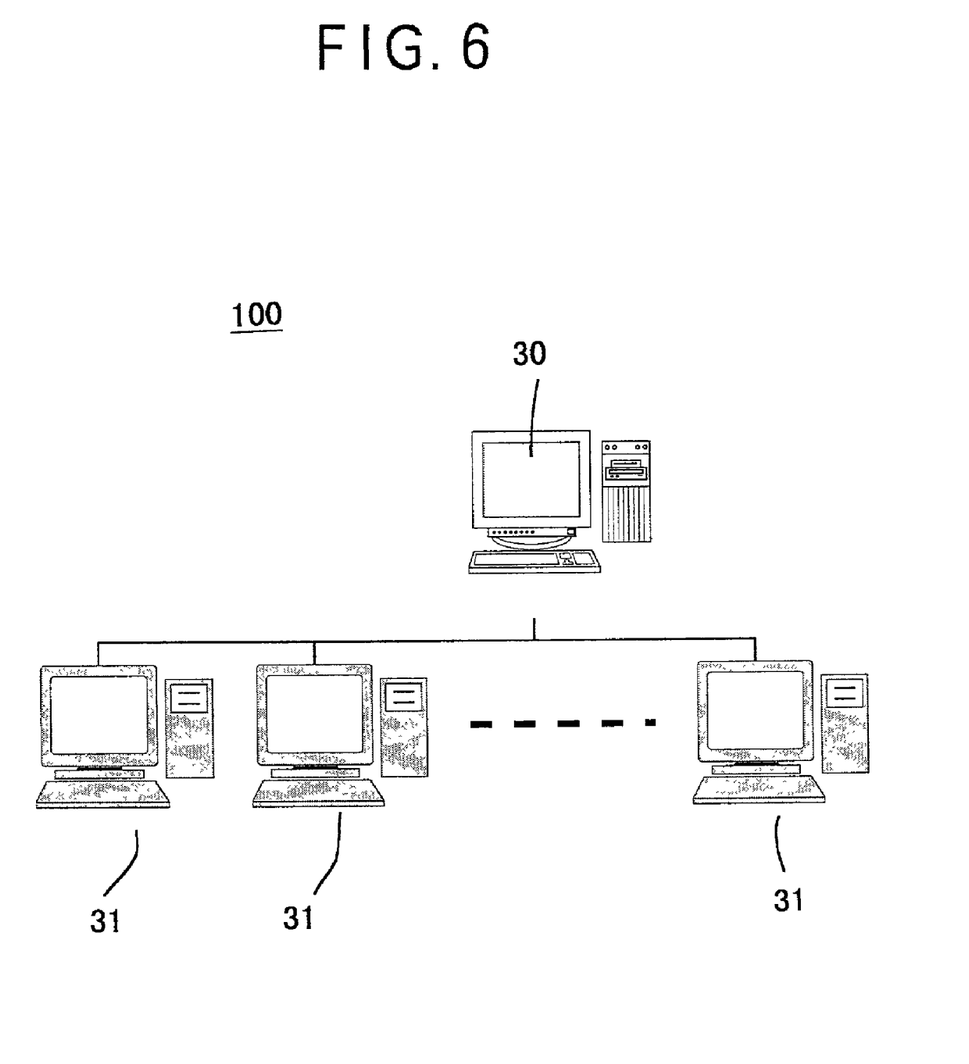
FIG. 6 is a diagram showing an example of a game system of the present system formed by utilizing a network.

Furthermore, as exemplified in FIG. 6, the game system of the present invention may be a game system including a server machine 30 and a plurality of client machines 31, . . . , 31 connected to the server machine 30 via a network such as a LAN or Internet. In this case, it is possible to make a storage device of each client machine 31 store the item possession data concerning the user of the client machine 31, transfer information for identifying the item possession state from a client machine 31 of the side which delivers an item to a client machine 31 of the side which receives the item via the server machine 30 when transaction of a game element has become necessary, and exchange various data, such as the information concerning the item selection state, as well between the client machines 31 via the server machine 30. Or it is also possible to make a storage device of the server machine 30 store all or a part of item possession data and other information of respective users, make the server machine 30 manage them, distribute data required for a client machine 31 of the winner side and a client machine 31 of the loser side from the server machine 30, and thereby implement the transaction of a game element between the client machines 31 and 31.

In the embodiment heretofore described, one game element is transacted for each competition. Alternatively, the number of game elements may be changed according to the result of a game such as a competition. For example, in the case of a win by a wide margin, the winner may acquire more game elements than those of the case of a win by a narrow margin. It is also possible to set so that game elements provides disadvantage in progress of the game and deliver a game element from the winner to the loser.

Furthermore, transaction of a game element is not limited to after the termination of the competition, but it may be conducted suitably in the middle of the competition. Furthermore, even in the case where a game other than a competition is executed on a plurality of game machines, a game element may be transacted between those game machines in accordance with the present invention.

According to the present invention, the game element delivered from the first game machine to the second game machine can be decided with due regard to the intention of the user of the side which receives the game element, as heretofore described. Therefore, it is possible to implement the transaction desired by the side which receives the game element and sufficiently exhibit the merit obtained by making possible the transaction of a game element between game machines. As a result, the charm of the game can be sufficiently increased.

What is claimed is:

1. A game system which allows users to play a common game in which at least one game element possessed by each of the users, among game elements expected to be used in the common game, is capable of being transacted between the users in the common game, the game system comprising:

at least two game machines each possessed by each of the users and communicative in a linkage with one another in a manner permitting data exchange therebetween, each of the at least two game machines comprising:

a possession information storage device for storing possession information for identifying a possession state of the game elements of the respective game machine, the possession information storage device including a game element storage device for storm game element information relating to the game elements in the common game, each of the game elements being corresponded to a serial number thereof, the possession information being data which associates the serial numbers of the game elements with a number representing how many of each of the game elements the game machine possesses;

a discrimination device for discriminating, based on and in response to an outcome of the common game, whether the respective game machine is a first game machine of the at least two game machines which provides possession of a particular game element of the game elements or a second game machine which receives possession of the particular game element, from amongst said at least two game machines;

a transaction information providing device for providing transaction information to the second game machine in response to the game machine being discriminated to be the first game machine, the transaction information indicating game elements acquirable to the second game machine from game elements possessed by the first game machine based on the possession information corresponding to the first game machine, the transaction information providing device being configured to generate the transaction information as a series of bits, one bit corresponding to each of the serial numbers of the game elements arranged in order of increasing serial numbers, each bit representing whether or not the first game machine possesses the game element corresponding to the respective serial number by having a state of 1 or 0;

a presentation device for presenting the acquirable game elements to the user of the second game machine via a display device of the second game machine, based on and in response to provision of the transaction information;

a transaction subject selection device for selecting at least one game element, to be gained possession of by the second game machine, from the acquirable game elements in response to a predetermined selection and decision operation on an input device of the second game machine;

an information update device for updating, in response to selection of a game element by the transaction subject selection device, the possession information so as to add possession of the selected game element to game elements possessed by the second game machine and delete possession of the selected game element from the game elements possessed by the first game machine an operation information providing device for providing operation information for identifying the selection and decision operation from the second game machine to the first game machine; and a selection situation display device for displaying an image indicating the selection of the game element on the display device of the second game machine in response to the selection and decision operation, and displaying an image indicating the selection of the game element on a display device of the first game machine, based on the operation information in synchronization with the displaying of the situation of selection of the game element on the display device of the second game machine.

2. A game system according to claim 1, wherein the common game is a game for conducting a predetermined competition among the plurality of game machines, and the first game machine and the second game machine are discriminated based on the second game being a winner of the competition.

3. The game system according to claim 1, wherein the outcome of the common game is a surrender of the first game machine to the second game machine.

4. The game system according to claim 1, wherein said linkage of said at least two game machines is a direct physical linkage permitting data exchange directly between said at least two game machines.

5. A game data exchange control method applied to a game system, the game system including game machines in a linkage with one another which allow users to play a common game by utilizing data exchange via a communication device, at least one game element possessed by a user of each game machine, among game elements expected to be used in the game, being made capable of being transacted between users in the common game, the game data exchange control method comprising the steps of:

producing game element information relating to the game elements to be used in the common game, each of the game elements having a corresponding serial number;

producing possession information for identifying a possession state of the game elements of each respective game machine, the possession information being data which associates the serial numbers of the game elements with a number representing how many of each of the game elements the game machine possesses;

discriminating, based on and in response to an outcome of the common game, whether the respective game machine is a first game machine of said at least two game machines, which provides possession of a game element of said game elements or a second game machine which receives possession of the game element, from amongst the game machines;

generating transaction information as a series of bits, one bit corresponding to each of the serial numbers of the game elements arranged in order of increasing serial numbers, each bit representing whether or not the first game machine possesses the game element corresponding to the respective serial number by having a state of 1 or 0;

providing the transaction information to the second game machine in response to the game machine being discriminated to be the first game machine, the transaction information indicating game elements acquirable to the second game machine from game elements possessed by the first game machine based on the possession information corresponding to the first game machine;

presenting the acquirable game elements to the user of the second game machine via a display device of the second game machine, based on and in response to provision of the transaction information;

selecting at least one game element, to be gained possession of by the second game machine, from the acquirable game elements in response to a predetermined selection and decision operation on an input device of the second game machine;

updating, in response to selection of a game element, the possession information so as to add possession of the selected game element to game elements possessed by the second game machine and delete possession of the selected game element from the game elements possessed by the first game machine;

providing operation information for identifying the selection and decision operation from the second game machine to the first game machine; and displaying an image indicating the selection of the game element on the display device of the second game machine in response to the selection and decision operation, and displaying an image indicating the selection of the game element on a display device of the first game machine, based on the operation information.

6. The method according to claim 5, wherein the outcome of the common game is a surrender of the first game machine to the second game machine.

7. The method according to claim 5, wherein said linkage of said at least two game machines is a direct physical linkage permitting data exchange directly between said at least two game machines.

8. A game machine for allowing a user of the game machine to play a common game with another user of a different game machine by utilizing data exchange via a communication device, at least one game element possessed by each of users of the game machine and the different game machine, among game elements used in the game, being made capable of being transacted in a linkage with each other between the users in the common game, the game machine comprising:

a possession information storage device for storing possession information identifying a possession state of the game elements of the game machine, the possession information storage device including a game element storage device for storing game element information relating to the game elements in the common game, each of the game elements being corresponded to a serial number thereof, the possession information being data which associates the serial numbers of the game elements with a number representing how many of each of the game elements the game machine possesses;

a discrimination device for recognizing, based on and in response to an outcome of the common game, whether the game machine is a first game machine which provides possession of the game element of the game elements or a second game machine which receives possession of the game element, and recognizing the different machine as being a remaining one of said first and second game machines;

a transaction information providing device, responsive to recognition of the game machine as the first game machine, for providing transaction information to the different game machine as the second game machine in response to the game machine being discriminated to be the first game machine, the transaction information indicating game elements acquirable to the different game machine from game elements possessed by the game machine, based on the possession information, the transaction information providing device being configured to generate the transaction information as a series of bits, one bit corresponding to each of the serial numbers of the game elements arranged in order of increasing serial numbers, each bit representing whether or not the first game machine possesses the game element corresponding to the respective serial number by having a state of 1 or 0;

a presentation device, responsive to recognition of the game machine as the second game machine, for presenting the acquirable game elements to the user of the game machine via a display device of the game machine, based on the transaction information for discriminating game elements acquirable to the game machine provided by the different game machine;

a transaction subject selection device, responsive to a predetermined selection and decision operation conducted on an input device of the game machine in response to the presentation of the game elements to the user of the game machine, for selecting at least one game element to be gained possession of by the game machine, from the acquirable game elements, and providing selection result information identifying the selection result to the different game machine;

an information update device, responsive to selection of the game element conducted by the user of the game machine based on the transaction information provided by the different game machine, or responsive to provision of selection result information identifying the selection result of the game element from the different game machine in response to the provision of the transaction information to the different game machine, for updating the possession information, based on the selection result;

an operation information providing device, responsive to recognition of the game machine as the second game machine, for providing operation information for identifying a situation of the selection and decision operation from the game machine to the different game machine; and a selection situation display device responsive to recognition of the game machine as the second game machine, for displaying an image indicating selection of the game element on the display device of the game machine in response to the selection and decision operation, and, responsive to recognition of the game machine as the first game machine, for displaying an image indicating selection of the game element on the display device of the game machine, based on the operation information in synchronization with the displaying of the situation of selection of the game element on the display device of the second game machine.

9. The game machine according to claim 8, wherein the outcome of the common game is a surrender of the first game machine to the second game machine.

10. The game machine according to claim 8, wherein said linkage of said at least two game machines is a direct physical linkage permitting data exchange directly between said at least two game machines.

11. A computer readable storage medium having an executable program recorded thereon, the program allowing a user of a game machine to play a common game with another user of a different game machine being in linkage with the game machine by utilizing data exchange via a communication device, and the program making it possible to transact at least one game element possessed by each of users of the game machine and the different game machine directly, among game elements used in the game, between the users in the common game, the program being formed so as to make a computer included in the game machine perform the steps of:

storing game element information relating to the game elements to be used in the common game, each of the game elements having a corresponding serial number;

storing possession information identifying a possession state of the game elements of the game machine, the possession information being data which associates the serial numbers of the game elements with a number representing how many of each of the game elements the game machine possesses;

recognizing, based on and in response to an outcome of the common game, whether the game machine is a first game machine which provides possession of the game element of the game elements or a second game machine which receives possession of the game element, and recognizing the different machine as being a remaining one of said first and second game machines;

responsive to recognition of the game machine as the first game machine, performing the following operations:

generating, based on the possession information, transaction information as a series of bits, one bit corresponding to each of the serial numbers of the game elements arranged in order of increasing serial numbers, each bit representing whether or not the first game machine possesses the game element corresponding to the respective serial number by having a state of 1 or 0; and providing the transaction information to the different game machine as the second game machine in response to the game machine being discriminated to be the first game machine, the transaction information indicating game elements acquirable to the different game machine from game elements possessed by the game machine;

responsive to recognition of the game machine as the second game machine, presenting the acquirable game elements to the user of the game machine via a display device of the game machine, based on the transaction information for discriminating game elements acquirable to the game machine provided by the different game machine;

responsive to a predetermined selection and decision operation conducted on an input device of the game machine in response to the presentation of the game elements to the user of the game machine, selecting at least one game element to be gained possession of by the game machine, from the acquirable game elements, and providing selection result information identifying the selection result to the different game machine;

responsive to selection of the game element conducted by the user of the game machine based on the transaction information provided by the different game machine, or responsive to provision of selection result information identifying the selection result of the game element from the different game machine in response to the provision of the transaction information to the different game machine, for updating the possession information, based on the selection result;

responsive to recognition of the game machine as the second game machine, providing operation information for identifying a situation of the selection and decision operation from the game machine to the different game machine; and responsive to recognition of the game machine as the second game machine, displaying an image indicating selection of the game element on the display device of the game machine in response to the selection and decision operation, and, responsive to recognition of the game machine as the first game machine, displaying an image indicating selection of the game element on the display device of the game machine, based on the operation information.

12. The computer readable storage medium according to claim 11, wherein the outcome of the common game is a surrender of the first game machine to the second game machine.

13. The computer readable storage medium according to claim 11, wherein said linkage of said at least two game machines is a direct physical linkage permitting data exchange directly between said at least two game machines.

* * * * *